(12) United States Patent
Krikler et al.

(10) Patent No.: US 7,328,164 B2
(45) Date of Patent: Feb. 5, 2008

(54) PRICING OPTIMIZATION APPARATUS AND METHOD

(75) Inventors: Samuel Krikler, Ra'anana (IL); Jacob Eckel, Ramat Gan (IL)

(73) Assignee: Earnix Ltd., Ramat-Gan (IL)

( * ) Notice: Subject to any disclaimer, the term of this patent is extended or adjusted under 35 U.S.C. 154(b) by 0 days.

(21) Appl. No.: 10/498,816

(22) PCT Filed: Jan. 14, 2003

(86) PCT No.: PCT/IL03/00036

§ 371 (c)(1),
(2), (4) Date: Jun. 23, 2004

(87) PCT Pub. No.: WO03/060625

PCT Pub. Date: Jul. 24, 2003

(65) Prior Publication Data

US 2005/0033706 A1 Feb. 10, 2005

Related U.S. Application Data

(60) Provisional application No. 60/348,380, filed on Jan. 16, 2002.

(51) Int. Cl.
*G06Q 99/00* (2006.01)
(52) U.S. Cl. .............. 705/1; 705/10; 705/14; 705/400
(58) Field of Classification Search .............. 705/5, 705/8, 400, 10, 14, 26, 1; 364/407
See application file for complete search history.

(56) References Cited

U.S. PATENT DOCUMENTS

| | | | | |
|---|---|---|---|---|
| 5,255,184 A | * | 10/1993 | Hornick et al. | 705/6 |
| 5,377,095 A | * | 12/1994 | Maeda et al. | 705/10 |
| 5,752,237 A | * | 5/1998 | Cherny | 705/4 |
| 5,918,209 A | * | 6/1999 | Campbell et al. | 705/5 |
| 6,038,540 A | * | 3/2000 | Krist et al. | 705/8 |
| 6,078,893 A | | 6/2000 | Ouimet et al. | |
| 6,308,162 B1 | | 10/2001 | Ouimet et al. | |
| 6,321,207 B1 | * | 11/2001 | Ye | 705/8 |
| 6,641,037 B2 | * | 11/2003 | Williams | 235/383 |
| 6,976,001 B1 | * | 12/2005 | Levanoni et al. | 705/10 |
| 2001/0014868 A1 | * | 8/2001 | Herz et al. | 705/14 |
| 2002/0042739 A1 | * | 4/2002 | Srinivasan et al. | 705/14 |
| 2002/0107819 A1 | * | 8/2002 | Ouimet | 705/400 |
| 2002/0116348 A1 | * | 8/2002 | Phillips et al. | 705/400 |
| 2002/0123930 A1 | | 9/2002 | Boyd et al. | |
| 2003/0101087 A1 | * | 5/2003 | Walker et al. | 705/10 |

FOREIGN PATENT DOCUMENTS

WO    WO 03/060625    7/2003

OTHER PUBLICATIONS

Subrahmanyan et al., Developing optimal pricing and inventory policies for retailers who face uncertain demand:, Spring 1996, Journal of Retailing, v72, n1, p. 7 (24).*
Grossprofit.com (Mar. 2, 2000).*
Merrit, Jennifer, "Company Makes Science Out of Shopping Trends", Aug. 28-Sep. 3, 1998, Boston Business Journal, 3 pgs.*

* cited by examiner

*Primary Examiner*—John W. Hayes
*Assistant Examiner*—Freda A Nelson

(57) ABSTRACT

A method or apparatus for automatically determining an optimum price for an offer by a first entity to a customer entity, comprising: obtaining a demand function representative of the customer, using the demand function and other factors include an intended product margin, building a goal function representative of goals of said first entity, and automatically optimizing the goal function for the margin, therefrom to generate the offer.

2 Claims, 4 Drawing Sheets

PRICING OPTIMIZATION APPARATUS AND METHOD

RELATED PATENT APPLICATION

This application is a National Phase Application of PCT/IL03/00036 International Filing Date 14 Jan. 2003, which claims priority from U.S. Provisional Patent Application No. 60/348,380 filed 16 Jan. 2002.

FIELD OF THE INVENTION

The present invention relates to a pricing optmization apparatus and method.

BACKGROUND OF THE INVENTION

The setting of prices of consumer products or services is one of the most important decisions a business enterprise is faced with. The price of a product or service is one of the main factors that determines the willingness of a consumer to purchase it, thus having a significant influence on the business performance of an enterprise. Nevertheless, a methodological approach for setting prices is seldom encountered in enterprises.

A standard practice in enterprises is to add a fixed gross margin to the cost of a product or service, without segmenting customers according to their willingness to pay. It is also possible to charge an optimal price according to the demand function of each customer. In this way, the same product or service could be offered to different customers at different prices. Such segmented marketing is not often used for consumer products but is quite frequent in large scale and business to business transactions.

U.S. Pat. No. 6,078,893 discloses a method for tuning a demand model in a manner that is stable with respect to fluctuations in the sales history used for the tuning. A market model is selected, which predicts how a subset of the parameters in the demand model depends upon information external to the sales history; this model may itself have a number of parameters. An effective figure-of-merit function is defined, consisting of a standard figure-of-merit function based upon the demand model and the sales history, plus a function that attains a minimum value when the parameters of the demand model are closest to the predictions of the market model. This effective figure-of-merit function is minimized with respect to the demand model and market model parameters. The resulting demand model parameters conform to the portions of the sales history data that show a strong trend, and conform to the external market information when the corresponding portions of the sales history data show noise.

Certain consumer products are generally customized. For example, in the case of insurance policies, the policy premium is determined by the actuarial risk of the customer, supplied by the actuarial models of the insurance company; and the specific gross margin required by the service provider. In this case the consumer only knows the price of the product or service offered to him, and not its breakdown into cost and margin. In an industry such as insurance, where the cost (actuarial risk) of the product or service is individualized, the consumer only knows the price quoted to him and is practically unable to compare it with the price of an identical product offered to somebody else.

A methodology for setting enterprise pricing is disclosed in U.S. Pat. No. 6,308,162, which discloses the collection of sales data and its automated optimization in the light of primary enterprise objectives such as maximization of profit and using secondary objectives such as retaining a certain market share. The methodology produces an overall result such as an optimal store price for a given product but is not intended for providing individual pricing.

Products such as insurance policies are not products that are sold once only, neither are they products that have a fixed price for all consumers, but rather are products that are renewed on a regular basis. Yet no automated methodology currently exists for taking renewal business into account in setting an optimal price. Furthermore no automated methodology exists for providing individualized pricing.

SUMMARY OF THE INVENTION

According to a first aspect of the present invention there is thus provided a method of automatically determining an optimum price for an offer by a first entity to a customer entity, comprising the steps of:

obtaining a demand function representative of said customer, using said demand function and a product margin, building a goal function representative of goals of said first entity, and automatically optimizing said goal function for said margin, therefrom to generate said offer.

Preferably, said demand function comprises expected behavior in respect of said offer together with expected behavior in respect of future offers, and wherein said automatically optimizing comprises taking into account said expected behaviors in respect of future offers.

Preferably, said automatically optimizing comprises iteratively optimizing backwardly from a furthest future offer to a present offer, in each iteration considering an offer respective to said iteration and an immediately previous offer.

Preferably, said building of said goal function comprises incorporating constraints into said goal function.

Preferably, said incorporating of said constraints comprises building an effective goal function using a lagrangian multiplier to represent said constraints.

The method may further comprise forming a set of non-linear equations from said Lagrangian multipliers and solving said non-linear equations.

Preferably, said solving of said non-linear equations comprises Newton Raphson iteration.

Preferably, said automatically optimizing comprises iteratively optimizing backwardly from a furthest future offer to a present offer, in each iteration considering an offer respective to said iteration and an immediately previous offer, in each stage using a lagrangian multiplier obtained by solution of said non-linear equations.

Preferably, said demand function representative of said customer is a demand function generated per customer.

Preferably, said goal function comprises a term for other income derived from products linked to a product being a subject of said offer.

Preferably, said building of said goal function comprises incorporating a time horizon therein.

Preferably, said automatically optimizing comprises using dynamic programming.

Preferably, said obtaining a demand function comprises applying logistic regression to a customer profile.

According to a second aspect of the present invention there is provided a method of automatically determining an optimum price for an offer by a first entity to a customer entity, comprising the steps of:

obtaining a demand function, using said demand function and a product margin, building a goal function representative of goals of said first entity including in said goal function a term for renewal by said customer, and automatically optimizing said goal function for said margin, therefrom to generate said offer, said optimization including said term for renewal.

According to a third aspect of the present invention there is provided apparatus for automatically determining an optimum price for an offer by a first entity to a customer entity, comprising:

a demand function input for obtaining a demand function representative of said customer, a goal function builder for using said demand function and a product margin, building a goal function representative of goals of said first entity, and a goal function optimizer for automatically optimizing said goal function for said margin, therefrom to generate said offer.

Preferably, said demand function comprises expected behavior in respect of said offer together with expected behavior in respect of future offers, and wherein said optimizer is operable to take into account said expected behaviors in respect of future offers.

Preferably, said optimizer is operable to optimize said goal function backwardly from a furthest future offer to a present offer, in each iteration considering an offer respective to said iteration and an immediately previous offer.

Preferably, said goal function builder is further operable to incorporate constraints into said goal function.

Preferably, said incorporating of said constraints comprises building an effective goal function using a Lagrangian multiplier to represent said constraints.

Preferably, said goal function builder is further operable to form a set of non-linear equations from said Lagrangian multipliers to represent said constraints in said goal function, and wherein said apparatus further comprises a non-linear equation solver for solving said non-linear equations, thereby to obtain a set of values for said Lagrangian multipliers that allow said goal function to satisfy said constraints.

Preferably, said solving of said non-linear equations comprises Newton Raphson iteration.

Preferably, said optimizer is operable to iteratively optimize backwardly from a furthest future offer to a present offer, in each iteration considering an offer respective to said iteration and an immediately previous offer, in each stage using a lagrangian multiplier obtained by solution of said non-linear equations.

Preferably, said demand function representative of said customer is a demand function generated per customer.

Preferably, said goal function comprises a term for other income derived from products linked to a product being a subject of said offer.

Preferably, said building of said goal function comprises incorporating a time horizon therein.

Preferably, said goal function optimizer is operable to use dynamic programming in order to carry out said automatically optimizing.

Preferably, said demand function input is operable to apply logistic regression to a customer profile, therefrom to obtain said demand function representative of a respective customer.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
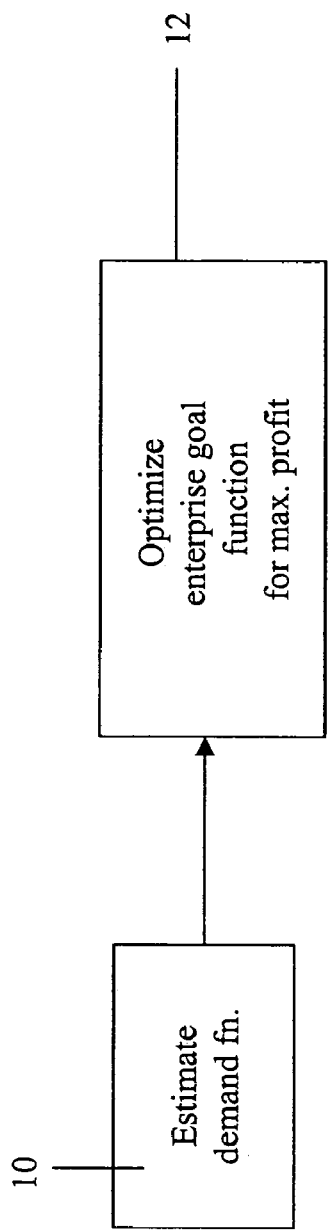
FIG. 1 is a simplified diagram showing the two-stage approach to price setting of the preferred embodiments of the present invention.

The present embodiments provide a method and apparatus for providing an optimized margin for offering a product or service. The optimization may take into account renewal business and/or may be personalized for individual customer or client profiles. It is noted that a sale price comprises a cost plus a margin, and therefore the concept of optimization of price, both in the description and claims, includes that of optimization of margin and vice versa.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified conceptual flow diagram giving an overview of a first preferred embodiment of the present invention. The estimate of an optimized price for a particular product for a particular customer comprises two separate stages, the first of which 10 is the estimate of a demand function for each individual customer. The second stage, 12 is the optimization of an overall goal function to maximize profit over the enterprise. The demand function estimated in stage 10 is used as one of the inputs from which the goal function is established, so that the goal function relates the estimated demand behavior of the individual customer to the overall goals sought by the enterprise. Optimization of the goal function is thus able to provide a price that is optimized both for the needs of the enterprise per se and for the specific need of the enterprise to retain the present customer. As will be explained below, optimization is not based only on the probability of making a current sale to the customer but also on the probability of future sales, in particular regular, renewal type sales.

Figure 2:
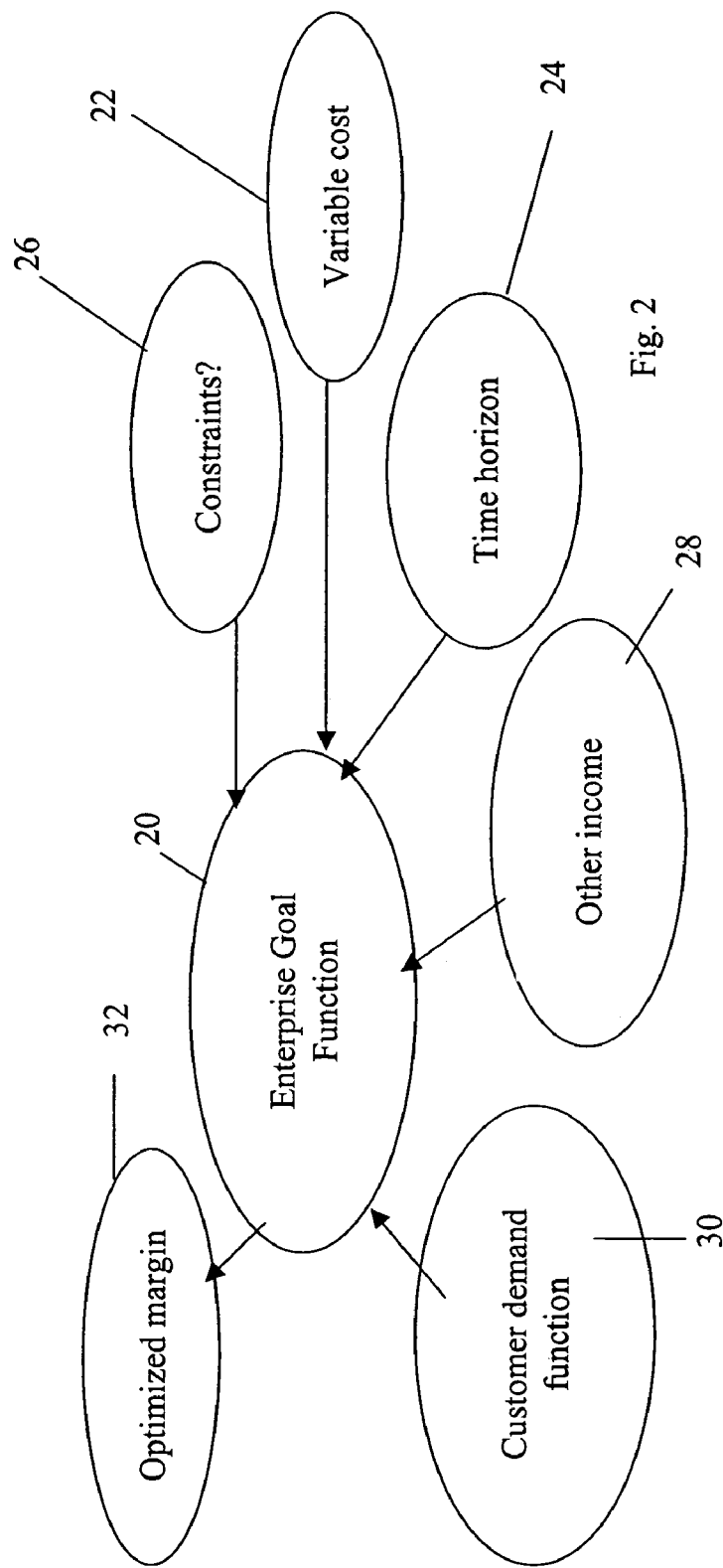
FIG. 2 is a simplified balloon diagram showing inputs and an output associated with the enterprise goal function.

Reference is now made to FIG. 2, which is a simplified balloon diagram showing inputs and outputs of the Enterprise goal function.

The goal function 20 is built up from a variable cost 22 of the product, a time horizon 24 for the product, constraints 26, if there are any, income 28 from associated products, and the estimated customer demand function 30. The above is not an exhaustive list as an individual enterprise may define its own goal function in any way it chooses.

Once the goal function is set up, then, again as will be described in greater detail below, it may be optimized to produce an optimized sale margin 32.

Individual elements used in producing the goal function 20 are considered in greater detail below.

Demand Function

The price can be decomposed into two elements, variable cost (VC) and margin:

$$P_t = VC_t + M_t$$

The variable cost represents all the direct costs that are incurred in the production process of a product or service and the costs that result from the selling of the product or service. For example, in the case of insurance premiums the main component of the variable cost is the expected claim (EC) imbedded in an insurance policy. But along with the expected claim, the post-selling service (S) and other expenses must also be considered as variable costs, to give:

$$VC_t = EC_t + S_t$$

For instances of t greater than the current time we may use the expected VC as an estimator and thereby treat it as fixed. For example, we can assume that the future expected claims, in the absence of claims in previous years, are a function of the current expected claim and decay throughout the policy life span, as follows:

$$EC_t = EC_{t-1} - K_t,$$

where $EC_t$ is the expected claim at year t, $K_t = \alpha K_{t-1}$ where $K_0 > 0$ and $\alpha$ is a constant ($1 \geq \alpha \geq 0$), $EC_0$ is the initial actuarial cost. In non-recursive form:

$$EC_t = EC_0 - K_0 \frac{1-\alpha^t}{1-\alpha}.$$

The margin is to be determined by the present methodology given constraints provided by the enterprise, and represents the gross profit per product or service.

The present embodiments deal with demand functions at the individual level. In general, the demand function relates the probability of a consumer purchasing a product or service as a function of the price offered and other factors. The other factors may include for example, competitor's prices and socioeconomic factors. Estimating a demand function is not trivial, and one method of estimating a demand function that uses logistical regression, is discussed below. The demand function, however obtained, is provided as an input to the formation of a goal function for the enterprise. When dealing with products or services subject to a renewal process, one may denote the demand function at period t as:

$$Q_t = D_t(P_t, M_t, X_t; \beta_t) \quad t=1$$

$$Q_t = D_t(P_{t-1}, P_t, M_t, X_t; \beta_t) \quad t=2,3,$$

where: $0 \leq Q_t < 1$;

$0 \leq P_t$;

Q denotes the probability of a given purchase being made;

P is the product's price;

X represent the customer profile (covariates) which is to say it represents variables included in customer profiles; and β the parameters of individual functions expressing customer differentiation.

The only assumption to be made regarding $D_t(\cdot)$ is that it is a strictly monotonic decreasing function of $P_t$. The period t denotes the first sale (t=1) or renewal instance ($2 \leq t$) in which an offer is given.

For the case of a renewal demand function the embodiments explicitly assume that one of the covariates is the price of the previous year's purchase $P_{t-1}$. The embodiments include such a variable in order to formalize the observed decision process that a person undergoes at the moment of a renewal, which is to compare prices of the current and previous period.

The preferred embodiments assume that the variable costs are known, so that the margin alone determines the price. The embodiments present the price as a variable in the demand function for exposition purposes, but due to the inclusion of the margin, the price becomes redundant. However, in the following, the terms "margin" and "price" are used interchangeably.

As will be discussed in more detail below in respect of FIG. 5, a preferred embodiment uses logistical regression in order to arrive at a personalized demand function. However the skilled person will appreciate that any kind of data mining is in principle usable.

Optimization Problem

At the moment of offering a product or service the enterprise has to select an offering price. Selection is achieved by optimization of the goal function, and the main component of the goal function which the embodiments seek to maximize is the expected profit of an offer:

$$\text{Profit}_t = (P_t - VC_t + OI_t)D_t(P_{t-1}, P_t, M_t, X_t, \beta)$$

where OI denotes other income expected as a byproduct of the selling of the main product or service. For example, the profit contributed by a complementary product or service that is sold alongside the main product or service (e.g., compulsory insurance that goes with a comprehensive car insurance policy). It may also represent the expected profit of future cross selling of products or services offered by the enterprise to current customers.

The precise goal function may be varied according to circumstances. The following presents several preferred goal functions that an enterprise wishes to maximize, and the skilled person will understand how to provide the appropriate goal function for his particular enterprise.

As mentioned above, constraints 26 may be present. Constraints are goals other than overall profit that apply to the enterprise, and typically appear in the goal program as secondary goals or constraints. Two different cases are considered below, unconstrained cases and constrained cases.

Unconstrained Cases

1) Firstly an unconstrained case is considered in which the sole goal is profit maximization. More particularly, the goal function seeks, for each individual offer, to maximize not only the profit of the current offer, but, in addition the present value (PV) of future cash flows that may be generated by renewals.

$$PV_t = (M_t + OI_t)D_t(P_{t-1}, P_t, M_t, .) + \sum_{i=t+1}^{T} \frac{(M_i + OI_i)\prod_{j=t}^{i}[kD_j(P_{j-1}, P_j, M_j, .)]}{(1+r)^{i-t}}$$

where k denotes the probability that a product or service will end its life span without being canceled and that the enterprise wishes to keep the present customer. Such a goal function is suitable for a renewable product since renewal is taken into consideration by the future cash flows. Usually the time horizon T, that is taken into account is large, in order to cover all significant future cash flow. The discount factor r is the cost of capital of the enterprise.

In order to maximize the goal function, we need to determine a set of margins for the current and subsequent periods $\{M_t, \ldots, M_T\}$ that maximizes the present value.

2) Although the above case is derived from an economic perspective, in realistic situations the enterprise managers set a relative short horizon for optimization purposes. Nevertheless, the embodiments assume that at each period the managers look forward to a horizon of the same length.

Constrained Cases

In the following the constrained case is considered. The constrained case is that in which profit maximization is constrained by other secondary goals. More particularly, the overall profit of the enterprise is the sum of each individual offer. If the enterprise's sole concern is maximizing its earnings, the maximization of each individual present value preferably gives the overall optimum. However, in practice the enterprise has secondary goals that are preferably to be considered in the optimization process. It is still preferable to seek to maximize the overall present value, but subject to constraints that incorporate the secondary goals. 1) The enterprise sets as a goal the need to attain a certain level of unit sales for each of the periods. For example, size of portfolio of insurance policies, number of magazines sold, etc. Formally:

$$\underset{M_{nt}}{MAX}\left\{\sum_n \left((M_{nt} + OI_{nt})D_t(P_{n,t-1}, P_{n,t}, M_{nt}, .) + \sum_{i=t+1}^{T} \frac{(M_{ni} + OI_{ni})\prod_{j=t}^{i}[kD_j(P_{n,j-1}, P_{n,j}, M_{nj}, .)]}{(1+r)^{i-t}}\right)\right\}$$

Subject to:

$$\sum_n D(P_{n,t}, M_{n,t}, .) = S_t$$

for each t, where S is the size of the portfolio.

2) The enterprise sets as a goal the attainment of a certain level of revenues for each of the periods. Formally:

$$\underset{M_{nt}}{MAX}\left\{\sum_n \left((M_{nt} + OI_{nt})D_t(P_{n,t-1}, P_{n,t}, M_{nt}, .) + \sum_{i=t+1}^{T} \frac{(M_{ni} + OI_{ni})\prod_{j=t}^{i}[kD_j(P_{n,j-1}, P_{n,j}, M_{nj}, .)]}{(1+r)^{i-t}}\right)\right\}$$

Subject to:

$$\sum_n P_{n,t}D(P_{n,t}, M_{n,t}, .) = R_t$$

for each period t, where $R_t$ is a targeted revenue level.

Optimization Methodology

In this section, optimization methods are discussed that solve the problems presented in the previous section.

Unconstrained Cases

For the unconstrained cases the embodiments apply a dynamic programming algorithm, which solves the problem in a more efficient way than exhaustive search.

1) The algorithm is based on the observation that the optimal margin at period t, $M_t$, only depends on the price at period t-1, $P_{t-1}$, and not on previous prices. This dependency is the expression of an assumption that the demand function involves only the price of the last period and not previous prices.

Thus for any time t, it is possible to find the optimal $M_t$ for each $P_{t-1}$ in a predefined range. Then iterating t down from T to 1, all mappings $M_t[P_{t-1}]$ can be found. In this way, in the last iteration the embodiment obtains $M_1[P_0]$, which is the margin sought for the current period $P_0$.

Figure 3:
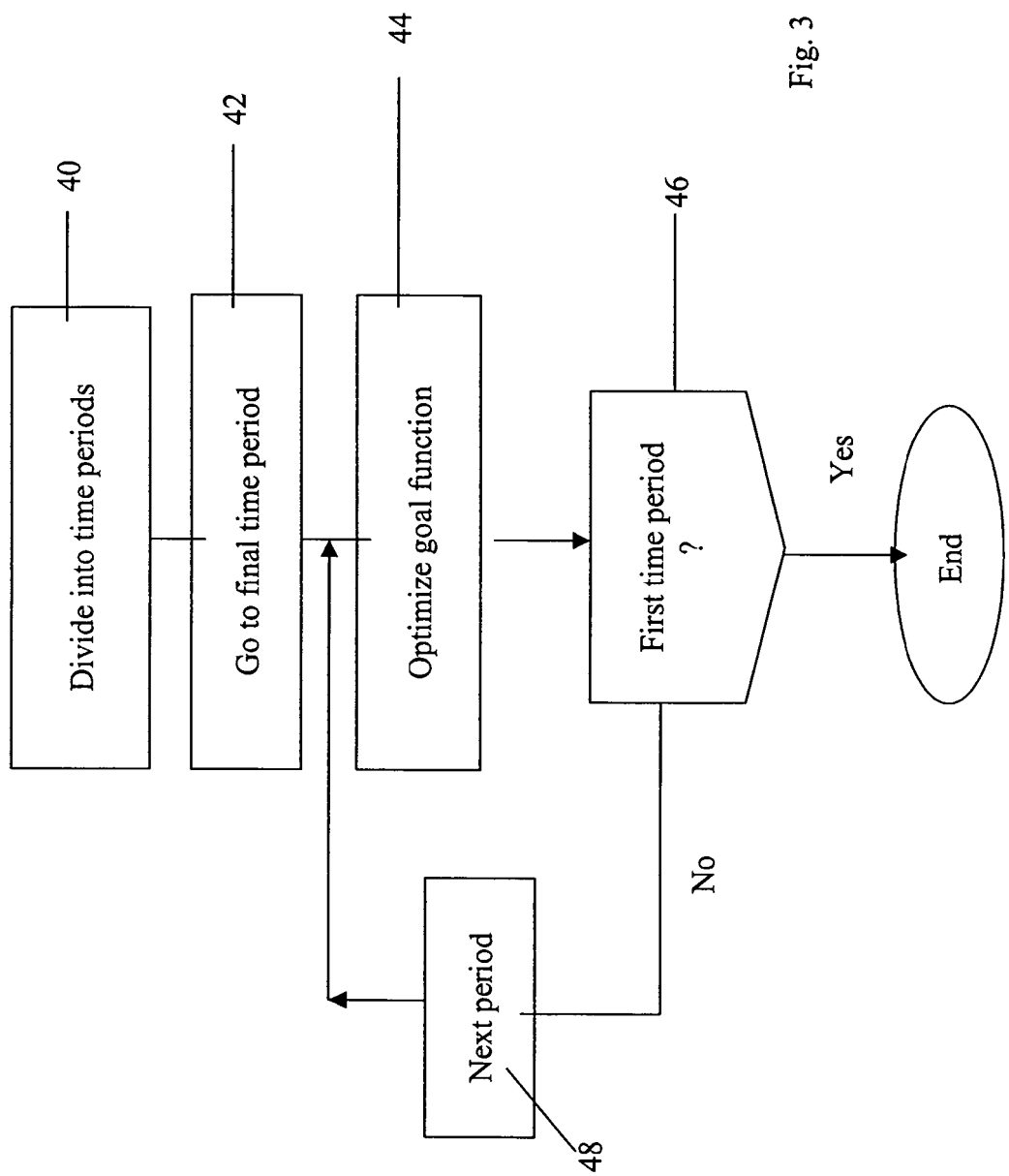
FIG. 3 is a simplified flow diagram showing a procedure for optimizing a goal function over a series of time periods using dynamic programming.

Reference is now made to FIG. 3, which is a simplified flow chart showing the procedure for optimizing the goal function in the unconstrained case.

Formally, at each iteration, going backwards from a final period T to a first period 1, the following is executed by preprogrammed software and/or dedicated hardware:

1. Make a partition of $P_{t-1}$ in the interval $[C_{t-1}, C_{t-1}+\Delta N]$, where $\Delta$ is the step size and N is the number of the current period, ranging from one to the total number of periods (stage 40 in FIG. 3).

2. Perform the loop of Stages 42-48 in FIG. 3 until all periods are complete. For each period $P_{t-1}$, starting with the final period T, find the $M_t$ that maximizes the expression $V(P_{t-1})$:

$$V(P_{t-1})=M_t D(P_{t-1},M_t)+kD(P_{t-1},P_t,M_t)V(P_t)/(1+r)$$

and $$V(P_{T-1}) = M_T D(P_{T-1}, P_T, M_T)$$

The optimization of $M_t$ can be performed by exhaustive search on a fixed partitioned interval or by more efficient algorithms like golden section search (See W. Press et. al., *Numerical Recipes in C*, p. 397, the contents of which are incorporated herein by reference) or parabolic-interpolation search (See W. Press et. al., *Numerical Recipes in C*, p. 402, the contents of which are hereby incorporated herein by reference.)

The above algorithm takes $O(T\Delta N^2)$ iterations.

The algorithm may be written in sketch computer code as:

```
procedure LongTerm given M_{-1}, T, r, D( ) returns M_0opt
    for each t from T-1 down to 0
        for each M_{t-1} in range [M_min, M_max] with step M_step
            E_t max = -∞
            for each M_t in range [M_min, M_max] with step M_prec
                Q_t = D(t, M_t, M_{t-1})
                E_t = Q_t * (M_t + Etable[t+1][M_t] / (1+r))
                if E_t > E_t max then
                    E_t max = E_t
                    M_t opt = M_t
            Mtable[t][M_{t-1}] = M_t opt
            Etable[t][M_{t-1}] = E_t max
    return Mtable[0][M_{-1}]
```

2) For the second case, namely unconstrained with short time horizon, we assume that the enterprise optimizes the NPV for a relatively short period h, typically 3 to 6 periods. However, such an optimization is preferably performed for each and every period.

The algorithm is similar to the previous one. It iterates backwards from T to 1, but optimizes:

$$V_t^h(P_{t-1}) = \underset{M_t}{\text{Max}}\{M_t D(P_{t-1}, P_t, M_t) + D(P_{t-1}, P_t, M_t) V_{t+1}^{h-1}(P_t)\} \Longrightarrow M_t(P_{t-1})$$

where:

$$V_t^{h-1}(P_{t-1}) = M_t(P_{t-1}) D(P_{t-1}, P_t(P_{t-1}), M_t(P_{t-1}) + D(P_{t-1}, P_t P_{t-1}), M_t(P_{t-1}) V_{t+1}^{h-1}(P_t)$$

$$\vdots$$

$$V_t^1(P_{t-1}) = M_t(P_{t-1}) D(P_{t-1}, P_t(P_{t-1}), M_t(P_{t-1}))$$

The algorithm may be written in sketch computer code as:
procedure SlidingWindow given $M_1$, P, T, r, D( ) returns $M_0$opt

```
for each t from P-1 down to 0
    for each M_{t-1} in range [M_min, M_max] with step M_step
        E_t max = -∞
        for each M_t in range [M_min, M_max] with step M_prec
            Q_accum = 1
            E_t = 0
            m_{t-1} = M_{t-1}
            m_t = M_t
            for each h from t to t+T-1
                Q_accum = Q_accum * D(h, m_t, m_{t-1})
                E_t = E_t + m_t*Q_accum/(1+r)^h
                m_{t-1} = m_t
                m_t = Mtable[h+1][m_t]
            if E_t > E_t max then
                E_t max = E_t
                M_t opt = M_t
        Mtable[t][M_{t-1}] = M_t opt
    return Mtable[0][M_{-1}]
```

The algorithm requires $O(Th\Delta N^2)$ iterations.

The algorithm may also be written in a recursive manner, which is more efficient:

```
procedure RecursionStart given M_{-1}, T, r, DF( ) returns M_0opt
    return RecursiveWindow(0, M_{-1}, T, r, DF, 1)
procedure RecursiveWindow given t, M_{t-1}, T, r, D( ), Q_t returns M_t opt
    if exists Mtable[t][M_{t-1}] then    //we already calculated the value
        return Mtable[t][M_{t-1}]
    E_t max = -∞                          //maximal E_t found until now
    for each M_t in range [M_min, M_max] with step M_prec  //search for M_t opt
        Q_accum = D(t, M_t, M_{t-1})       //accumulated renewal probability
        E_t = M_t*Q_accum/(1+r)^t          //E_t for the selected M_t
        m_{h-1} = M_t
        for each h from t+1 to t+T-1       //accumulating E_t for T-1 years
            if E_t*Q_t < NEGLIGIBLE then   //recursion termination
                                           condition
                break
                                           // recursive step for optimal M_h
            m_h = RecursiveWindow(h, m_{h-1}, T, r, DF, Q_t*Q_accum)
            Q_accum = Q_accum * D(h, m_h, m_{h-1})  //updating Q_accum
            E_t = E_t + m_h*Q_accum/(1+r)^h         //updating E_t
            m_{h-1} = m_h
        if E_t > E_t max then              //if the new E_t is higher
            E_t max = E_t                   //update with the new E_t
            M_t opt = M_t
        Mtable[t][M_{t-1}] = M_t opt       //save the optimal M_t
    return M_t opt
```

Constrained Optimization

The two cases of constrained optimization can be solved in a manner similar to the above. There are several methodologies to optimize a function subject to constraints. In the preferred embodiments to be described below, a mixture is applied of the dynamic programming algorithm of the unconstrained cases above, together with use of the well-known Newton-Raphson iteration method for finding the roots of a non-linear set of equations.

It is assumed that a known set of individuals approach the enterprise and ask for a price quote on the product or service the enterprise offers. These individuals may be asking for a first offer or be current customers renewing their products or services. In the case of a purchase, all members of the set approach the enterprise at the following period for a renewal. At the following period it is also assumed that new clients approach the firm, and so on for each period.

Figure 4:
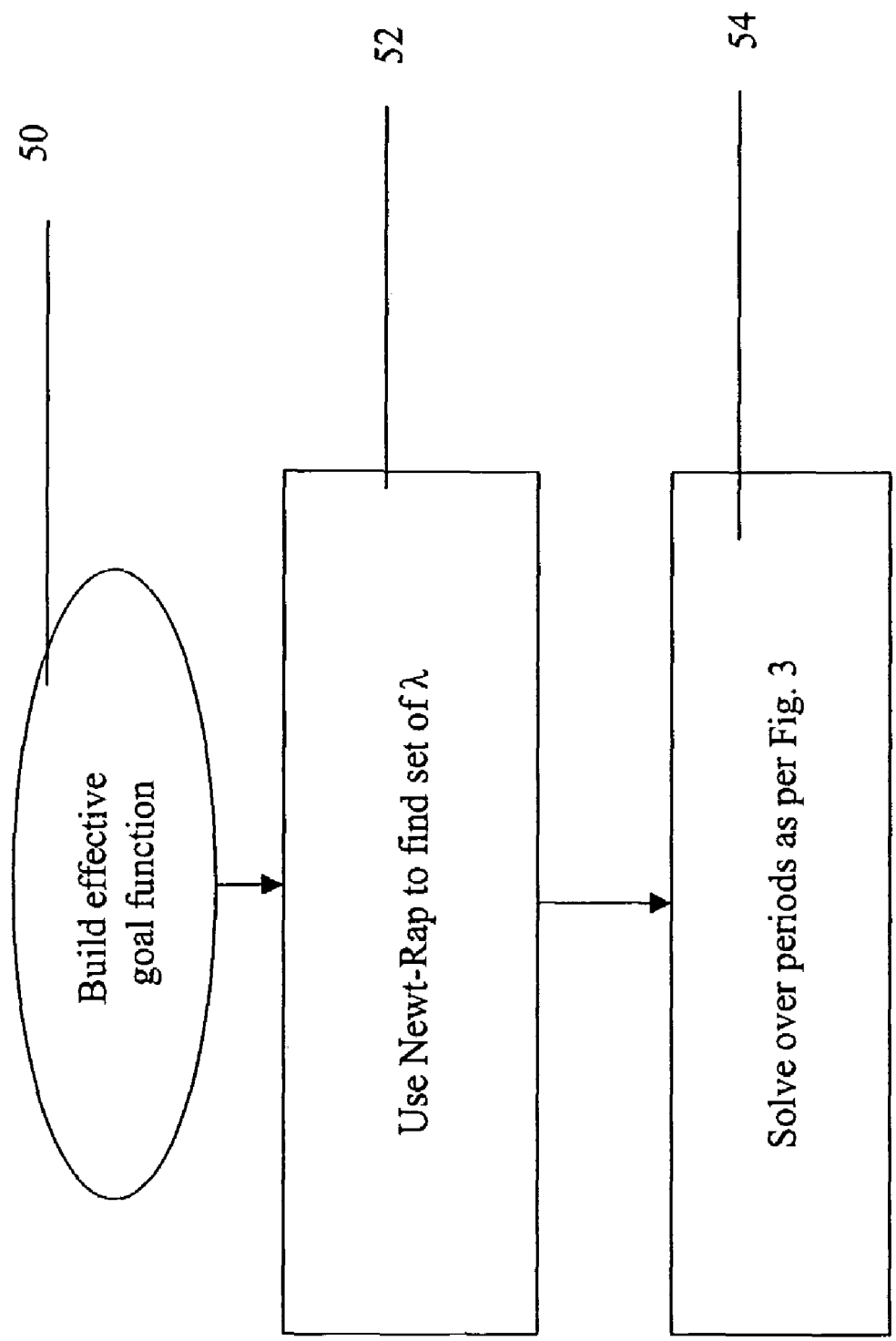
FIG. 4 is a simplified flow diagram showing additional steps required prior to the procedure of FIG. 3 in the event of there being constraints.

Reference is now made to FIG. 4, which illustrates in general terms the procedure for optimizing a goal function having constraints.

In order to solve the above-described constraint problem the embodiments build a Lagranian function, (stage 50 in FIG. 4) which comprises augmenting the goal function by the constraints, and thereby obtaining an effective goal function for subsequent optimization:

$$GoalFunction = \sum_i pv_1(M_1) - \sum_t \lambda_t \left( \sum_i \theta_t(M_t) - R_t \right)$$

Where, $M_i$ denotes the set of all margins for individual i for period 1 to T.

$\lambda_t$ is the Lagrange multiplier for period t $$\sum_i \theta_t(M_1) - R_t = 0$$

is the secondary target goal (constraint) for each time period t=1 to T.

We note that for fixed $\lambda_t$ the margin set $M_i$ is optimized for each individual in the same manner as in the unconstrained case. Thus, local optimizations for individuals, when taken together, provide a global optimum of the goal function because each individual's demand function is not influenced by the prices given to other individuals. Thus, in order to achieve a global maximum income one may maximize each local demand function. However if there is a further constraint, for example a certain minimum number of customers, then one sets the offers to each individual so that the combined probabilities give the minimum number of customers.

The problem is to find those $\lambda_t$ for which the optimal margins $M_i$ also satisfy the constraints. Thus, the problem may be reduced to that of finding the roots of a non-linear set of equations:

$$\phi_1(\lambda_1, \ldots, \lambda_t) = 0$$
$$\vdots$$
$$\phi_t(\lambda_1, \ldots, \lambda_t) = 0$$

The above problem is solved (stage 52) by the Newton-Rapshon method (W. Press, "Numerical Recipes in C", p. 379). In order to use Newton-Raphson in cases in which analytical derivatives are unavailable, it is preferably to use Broyden's method (W. Press, "Numerical Recipes in C", p. 389) to approximate the Jacobian matrix.

Finally, in a stage 54, per period iteration is carried out as in the unconstrained case of FIG. 3, using the values of $\lambda$ obtained in stage 52.

Figure 5:
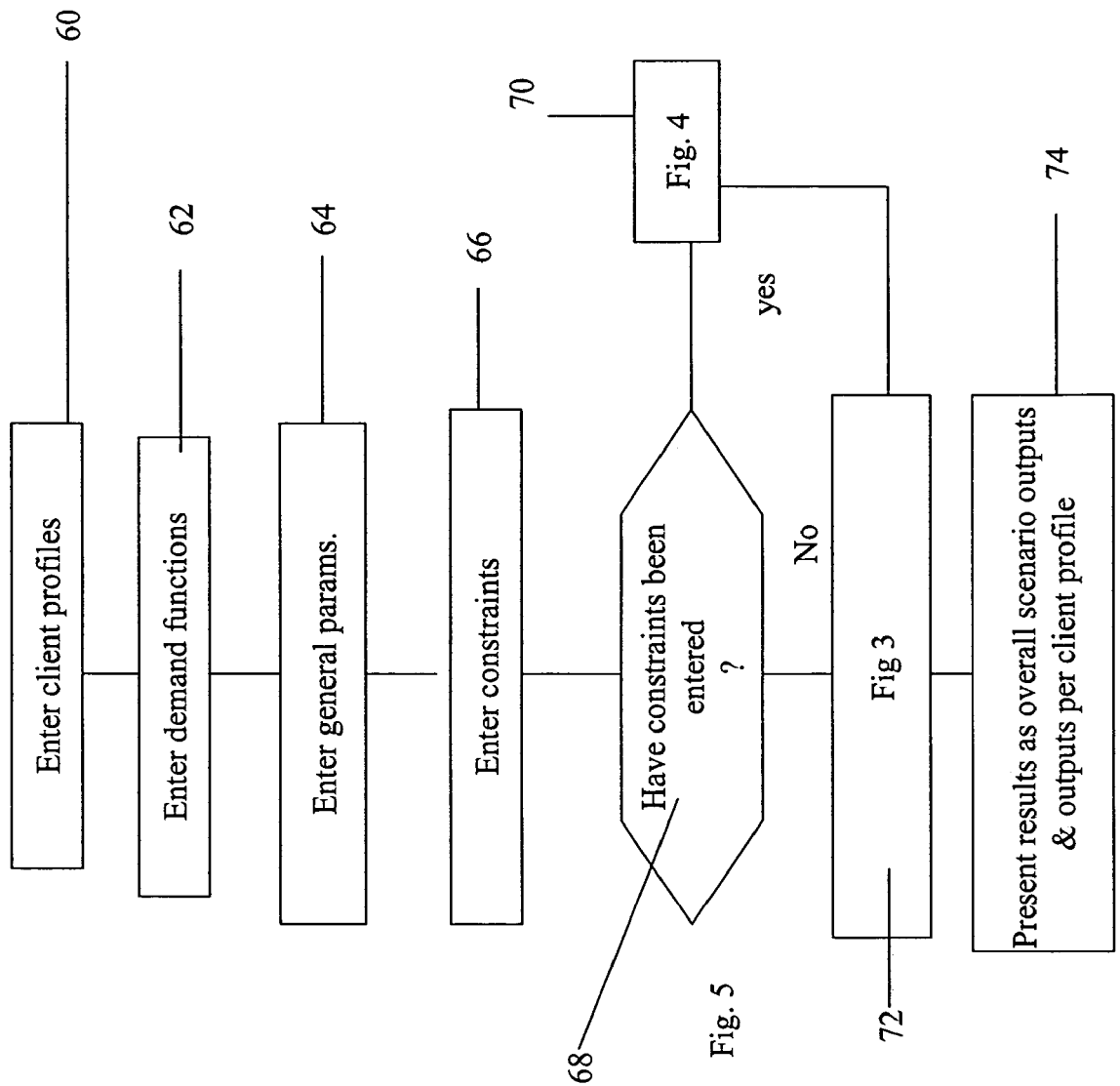
FIG. 5 is a simplified flow diagram showing an overall method for obtaining personalized optimized pricing and incorporating the procedures of FIGS. 3 and 4 therein.

Reference is now made to FIG. 5, which is a simplified flow chart showing operation of a methodology according to the present invention that utilizes the procedures described in respect of FIGS. 1-3. In a first stage 60, the user enters profiles for his various clients. The profiles preferably include any factors available to the user about the client that has to do with the probability of making a sale to the respective client of the product, and may include age, sex, and socioeconomic group, prices offered by competitors etc. For example, the user may feel that a major factor in selling a given product is age. In such a case he will make age, or a generalized age group a prominent part of the profile provided that he has the data available.

In a following stage, 62, a generalized demand function is used with data from the profile to produce a specific demand function for the individual clients of interest. Typically a demand function is a function that describes probabilities of either purchasing or not purchasing a product, and is thus ideally suited to techniques such as logistical regression. For a series of i conditions Xi in a given client's profile, each condition can be given a weighting $\beta$. The weighted conditions can then be summed, and the summation used to determine the individual customer's demand. Thus $$y = \frac{1}{1 + e^{\sum_i \beta_i z_i}}$$

In a following stage 64, general parameters are entered, such as the product variable cost, the time horizon of interest, other income—that is likely income from sales of associated products) and other like parameters deemed to be relevant.

In stage 66, constraints are entered if any. As discussed above, constraints are secondary goals that the enterprise wishes to take into account, and may include factors such as wishing to maintain a certain market share, or wishing to retain a certain price image.

Stage 68 is a decision stage in which the system determines whether constraints have been entered. If constraints have been entered then the method branches to stage 70 in which the procedure of FIG. 4 is carried out to set up an effective goal function, and the procedure of FIG. 3 is entered indirectly. If constraints have not been entered then the procedure of FIG. 3 is entered directly as stage 72. Finally, in a stage 74, results are presented. Preferably, the results include both overall results for the client database and individual results for each client profile. Thus each client can be offered the product at a personally tailored price.

It is appreciated that certain features of the invention, which are, for clarity, described in the context of separate embodiments, may also be provided in combination in a single embodiment Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including defintions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A method of automatically determining optimum prices for offers by a first entity to customer entities, comprising the steps of:
   obtaining
      a set of demand functions individually parameterized for respective customer entities, and
   using said set and product margins, constructing a goal function representative of goals of said first entity, and
   automatically maximizing said goal function using said set, to optimize said margins, therefrom to generate optimized offers to corresponding customer entities and
   wherein said demand function comprises expected behavior in respect of said offer together with expected behavior in respect of future offers, and wherein said automatically optimizing comprises taking into account said expected behaviors in respect of future offers and
   wherein said automatically optimizing comprises iteratively optimizing backwardly from a furthest future offer to a present offer, in each iteration considering an offer respective to said iteration and an immediately previous offer.

2. A method of automatically determining optimum prices for offers by a first entity to customer entities, comprising the steps of:
   obtaining
      a set of demand functions individually parameterized for respective customer entities,
   using said set and product margins, constructing a goal function representative of goals of said first entity, and
   automatically maximizing said goal function using said set, to optimize said margins, therefrom to generate optimized offers to corresponding customer entities and
   wherein said constructing of said goal function comprises incorporating constraints into said goal function and
   wherein said incorporating of said constraints comprises building an effective goal function using a Lagrangian multiplier to represent said constraints and
   further comprising forming a set of non-liner equations from said Lagrangian multipliers and solving said non-linear equations,
   wherein said automatically optimizing comprises iteratively optimizing backwardly from a furthest future offer to a present offer, in each iteration considering an offer respective to said iteration and an immediately previous offer, in each stage using a lagrangian multiplier obtained by solution of said non-linear equations.

* * * * *